United States Patent [19]

Sauze

[11] Patent Number: 4,765,589
[45] Date of Patent: Aug. 23, 1988

[54] DEVICE FOR REGULATING OR VARYING THE ROTATION ANGLE OF A CONTROL SHAFT OF A VALVE OR GATE

[75] Inventor: Bernard Sauze, Sorbiers, France

[73] Assignee: Dresser Industries, Inc., Dallas, Tex.

[21] Appl. No.: 33,101

[22] PCT Filed: Apr. 28, 1986

[86] PCT No.: PCT/FR86/00143
§ 371 Date: Mar. 5, 1987
§ 102(e) Date: Mar. 5, 1987

[87] PCT Pub. No.: WO86/06812
PCT Pub. Date: Nov. 20, 1986

[30] Foreign Application Priority Data

May 10, 1985 [FR] France .................. 85 07083

[51] Int. Cl.⁴ .................. F16K 31/122; F16K 31/528
[52] U.S. Cl. .................. 251/229; 251/58; 251/279; 251/305; 74/25; 74/89
[58] Field of Search ............ 74/25, 89, 105; 251/58, 251/229, 279, 305

[56] References Cited

U.S. PATENT DOCUMENTS

| 2,269,382 | 1/1942 | Schmidt | 251/58 |
| 2,953,344 | 9/1960 | Yancey | 74/89 |
| 3,263,516 | 8/1966 | Chisholm | 74/105 |
| 3,610,568 | 10/1971 | Durve | 251/58 |
| 3,684,237 | 8/1972 | Hyde et al. | 251/58 |
| 3,939,058 | 12/1975 | Smith | 251/58 |
| 3,952,995 | 4/1976 | Nagumo et al. | 251/58 |
| 4,050,670 | 9/1977 | Borg et al. | 251/58 |
| 4,527,769 | 7/1985 | Stogner et al. | 251/58 |

FOREIGN PATENT DOCUMENTS

| 647978 | 7/1935 | Fed. Rep. of Germany | 251/58 |
| 143471 | 5/1920 | United Kingdom | 74/105 |
| 2005373 | 4/1979 | United Kingdom | |

Primary Examiner—George L. Walton
Attorney, Agent, or Firm—Glaser, Griggs & Schwartz

[57] ABSTRACT

A linkage apparatus comprised of two interconnected levers extending between a valve actuator for a rotatable valve and a rotatable operating shaft of the valve. The relative position of the interconnection between the levers is presettably adjustable so as to enable varied operation in the rotational displacement of the operating shaft. Effecting the adjustment is independent of the actuator operation.

5 Claims, 1 Drawing Sheet

DEVICE FOR REGULATING OR VARYING THE ROTATION ANGLE OF A CONTROL SHAFT OF A VALVE OR GATE

The present invention relates to a device for regulating or varying the flow characteristic (flow coefficient) of a standard valve or gate having a rotating shaft; it also permits to adjust or vary the resulting torque without changing the features of the actuator.

Butterfly valves or ball valves or rotary valves and, more generally, any isolating or control valves provided with a closing element rotating when actuated, have flow value depending (either linearly, exponentially or in any other way) on the rotation angle of the closing element.

Generally isolating valves have a rotation angle of about or equal to 90° while control valves generally have their shaft rotating from 40° to 75° (for dynamic torque reason).

Furthermore to be noted that globe control valves having a stem linearly moved make possible (with respect to a given size) to achieve an "orifice reduction" by only substituting to the nominal diameter of the plug/seat assembly another plug/seat assembly having a smaller nominal diameter: by way of example, a plug/seat assembly having a reduction factor of 0.6 will permit to restrict the maximum flow by 40%. Presently such a possibility does not exist within any rotating shaft valve, but the hereby described present invention does permit to obtain in a rotating shaft valve an equivalent result through a much simpler system having a better flexibility in use and operating over an extended continuous adjustment range.

In addition the device according to this invention, when provided with a control piston or any other actuator device having a non variable stroke, permits to actuate valves which due to their different sizes have different shaft rotation angles, different strokes or different dynamic torques.

Presently, when one of those parameters: rotation angle, stroke or resultant torque, is modified, the known techniques need to have a new actuator, either entirely or partly substituted for.

The device according to the present invention overcomes those drawbacks while reducing the cost of the parts kept in stock for various needs; it gives the user more possibilities so that the user can more easily vary such parameters as nominal valve aperture or actuation torque. The novelty of this device results from its inherent adjustment facility in allowing correction of any oversizing or undersizing of flow capacities or actuation torque.

Figure 1:
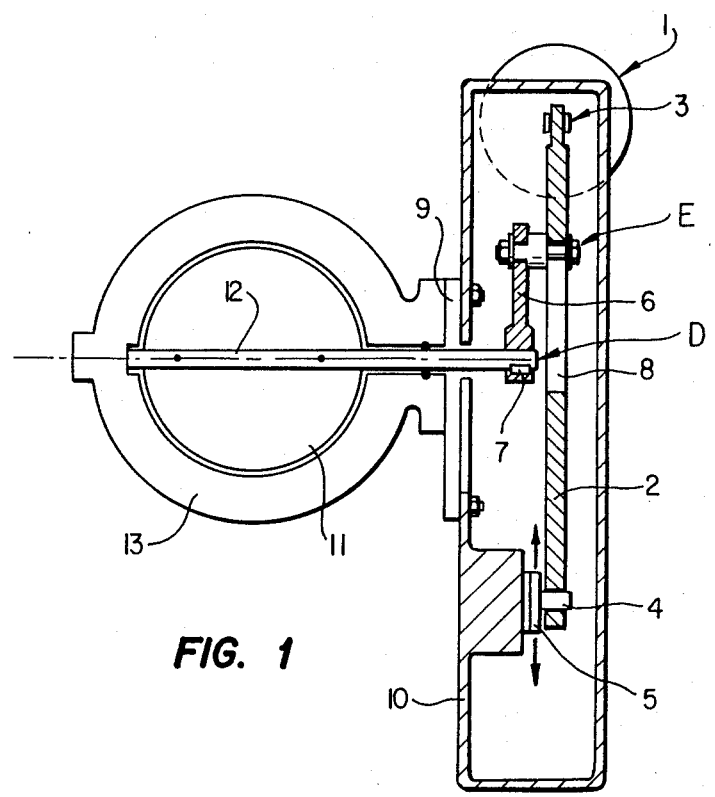
FIG. 1 is a cross-sectional view of the device according to this invention.

The actuator, for instance a piston, is pushing a primary lever (2) through a clevis (3) located at its upper end. At the lower end of the primary lever (2), there is provided an axis (4) that is linked to a vertically sliding bearing (5) that causes in operation the piston clevis (3) to linearly move while successively crossing points (A), (B) and (C).

The primary lever (2) is pulling (at a point (E)) a secondary lever (6) that is in turn secured (through a key (7)) to the valve shaft (12) at a point (D). The primary lever (2) and the secondary lever (6) are together linked at a point (E) through a rotatable axis that can slide in a keyslot (8).

Figure 2:
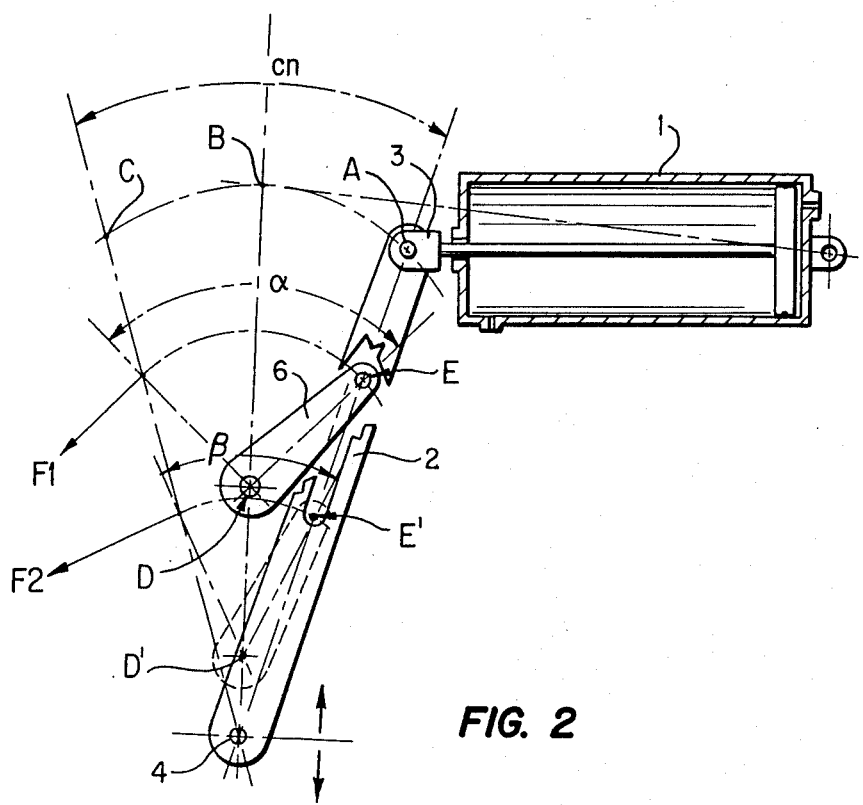
FIG. 2 is a side view in the direction of A, FIG. 1.

When the point (E) moves in the keyslot (8) (by simultaneously moving the intermediate mounting plate (9) and the cover (10), the rotation angle α varies (maximum angle shown in FIG. 2); that angle increases or decreases depending on the adjustment direction and may be set at a minimum angle value (angle β shown in FIG. 2) when the setting is located at E'; such an angle variation does affect by the same value the rotation angle of the control shaft (12) of the valve (13) and then the vane (11), which then corresponds to modifying the nominal flow coefficient through the valve or gate; such an angle variation also modifies also the resulting operation torque F1 or F2 applied to the valve shaft (12) and this is done (device novelty) without any modification of the characteristics (nominal stroke on) of the actuator (1).

I claim:

1. In the combination of a valve (13) or gate having a rotatable closure member (11) operated by a rotatable shaft (12), said shaft being angularly settable to select a desired flow rate through said valve and an actuator (1) operative through a stroke range to effect changing angular settings of said shaft, connector means connected intermediate between said actuator and said shaft and operable to translate a given stroke of said actuator into angular displacement of said shaft, said connector means including first and second components interconnected through a slot and presettably adjustable by a relatively displaceable setting means associated with said slot to vary the amount of effected angular shaft displacement for a given stroke of said actuator to effect said desired flow rate.

2. In the combination of claim 1 in which said actuator (1) has a predetermined completion stroke, said connector means includes a sliding bearing (5) having means defining an axis of rotation (4), one of said first and second components comprises a primary lever (2) connected for displacement at one end to said actuator and is connected at its other end to said means defining said axis of rotation, said bearing and said means defining said axis of rotation being effective when said one end of said primary lever is displaced by said actuator for said lever end to incur an arcuate path of motion extending through a plurality of predetermined points (A) (B) (C).

3. In the combination of claims 1 or 2 in which the other of said first and second components comprises a secondary lever (6) interconnected through said slot for rotation at one end to primary lever (2) at a location (E) intermediate the ends of lever (2) and secured at its other end to shaft (12) for effecting rotation of shaft (12) in response to operational displacement by actuator (1).

4. In the combination of claims 1 or 2 in which the interconnection at location (E) between the one end connection of said secondary lever (6) and said primary lever (2) is relatively displaceable for a presettable distance between selected locations (E) and (E') for effecting said presettable adjustment in correlation to predetermined changes in the desired rate flow through valve (13) sought to be achieved.

5. In the combination of claim 3 in which the interconnection at location (E) between the one end connection of said secondary lever (6) and said primary lever (2) is relatively displaceable for a presettable distance between selected locations (E) and (E') for effecting said presettable adjustment in correlation to predetermined changes in the desired rate flow through valve (13) sought to be achieved.

* * * * *